(12) United States Patent
Appel et al.

(10) Patent No.: US 12,312,183 B2
(45) Date of Patent: *May 27, 2025

(54) MATERIAL MOVING APPARATUS, SYSTEMS AND METHODS

(71) Applicant: SoftWear Automation Inc., Cumming, GA (US)

(72) Inventors: D. Keith Appel, Atlanta, GA (US); Michael J. Baker, Acworth, GA (US); Jeremy Nagorka, Austell, GA (US)

(73) Assignee: SOFTWEAR AUTOMATION INC., Cumming, GA (US)

( * ) Notice: Subject to any disclaimer, the term of this patent is extended or adjusted under 35 U.S.C. 154(b) by 491 days.

This patent is subject to a terminal disclaimer.

(21) Appl. No.: 17/164,708

(22) Filed: Feb. 1, 2021

(65) Prior Publication Data

US 2021/0371213 A1 Dec. 2, 2021

Related U.S. Application Data

(63) Continuation of application No. 16/889,278, filed on Jun. 1, 2020, now Pat. No. 10,906,755.

(51) Int. Cl.
*B65G 47/91* (2006.01)
*B25J 9/16* (2006.01)
*B25J 15/08* (2006.01)

(52) U.S. Cl.
CPC ........... *B65G 47/911* (2013.01); *B25J 9/1612* (2013.01); *B25J 15/08* (2013.01)

(58) Field of Classification Search
CPC ....... B65G 47/911; B25J 9/1612; B25J 15/08; B25J 15/0616; B25J 15/00; B65H 2406/3661; B65H 2555/30; B65H 3/02; B65H 3/14; B65H 3/22; B65H 3/32; B65H 3/48; B65H 2701/174
See application file for complete search history.

(56) References Cited

U.S. PATENT DOCUMENTS

| | | | |
|---|---|---|---|
| 5,510,993 A | 4/1996 | Williams | |
| 7,635,125 B2 * | 12/2009 | Ikeda | B65H 1/14 271/31 |

(Continued)

FOREIGN PATENT DOCUMENTS

| | | | |
|---|---|---|---|
| DE | 3816250 A1 | 11/1989 | |
| WO | WO-2005063453 A8 * | 11/2005 | ........... B23Q 1/5462 |
| WO | 2021003141 A1 | 1/2021 | |

OTHER PUBLICATIONS

International Search Report for PCT/US2021/035127 mailed Sep. 24, 2021.

*Primary Examiner* — Stephen A Vu
(74) *Attorney, Agent, or Firm* — Thomas | Horstemeyer, LLP (57) ABSTRACT

Material moving apparatus, systems and methods are presented which can include an air material mover. Airflow through orifices can create a localized vacuum such that the uppermost or top layer of material can be separated from the stack of material. The airflow can interact with the material to produce flutter, which assists in separating lower layers from the uppermost layer. A material gripper can grip the uppermost or top layer of material for removal from the stack and repositioning in a work area.

20 Claims, 5 Drawing Sheets

(56) References Cited

U.S. PATENT DOCUMENTS

| | | | |
|---|---|---|---|
| 7,753,358 B2 * | 7/2010 | Ikeda | B65H 3/128 |
| | | | 271/96 |
| 8,740,214 B2 | 6/2014 | Onodera | |
| 10,906,755 B1 * | 2/2021 | Appel | B65H 5/14 |
| 2004/0077217 A1 | 4/2004 | Hwang | |
| 2010/0181716 A1 * | 7/2010 | Suzuki | B65H 1/14 |
| | | | 271/12 |
| 2010/0194031 A1 * | 8/2010 | Ikeda | B65H 3/48 |
| | | | 271/11 |
| 2011/0006474 A1 * | 1/2011 | Ikeda | B65H 3/0607 |
| | | | 271/264 |
| 2013/0108408 A1 | 5/2013 | Saison | |
| 2013/0127192 A1 | 5/2013 | Regan | |
| 2014/0199153 A1 | 7/2014 | Reinhold | |

* cited by examiner

MATERIAL MOVING APPARATUS, SYSTEMS AND METHODS

CROSS REFERENCE TO RELATED APPLICATIONS

This application claims priority to, and the benefit of, co-pending U.S. non-provisional application entitled "Material Moving Apparatus, Systems and Methods" having Ser. No. 16/889,278, filed Jun. 1, 2020, which is hereby incorporated by reference in its entirety.

FIELD OF THE DISCLOSURE

The present disclosure is generally related to the automation of material manipulation using robotic systems. More specifically, the disclosure is related to apparatuses, systems and methods that can manipulate stacked materials to allow a gripper to secure and transport a layer of material to a desired work area.

BACKGROUND

Automated processing often relies on the separation of a single layer of material, however separating one layer of material from a stack using automated methods is difficult. The difficulty depends on the properties of the material (e.g., stiffness, construction, thread type, interlayer entanglement, etc.), which not only vary based on the target material but also by environmental differences during operation. Prior to the development of material processing machines, humans used fingers to pick one layer and eyes to verify that only one layer was picked. Current devices used in material separation, such as claw, vacuum, needle, or roller grippers often damage the material or are susceptible to the above-mentioned material variations leading to inconsistencies in performance.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

BRIEF DESCRIPTION OF THE DRAWINGS

The accompanying drawings illustrate various examples of systems, methods, and embodiments of various other aspects of the disclosure. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles. Moreover, in the drawings, like reference numerals designate corresponding parts throughout the several views.

DETAILED DESCRIPTION

Disclosed herein are various examples related to automation of sewing using sewing robots. Some embodiments of this disclosure, illustrating its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
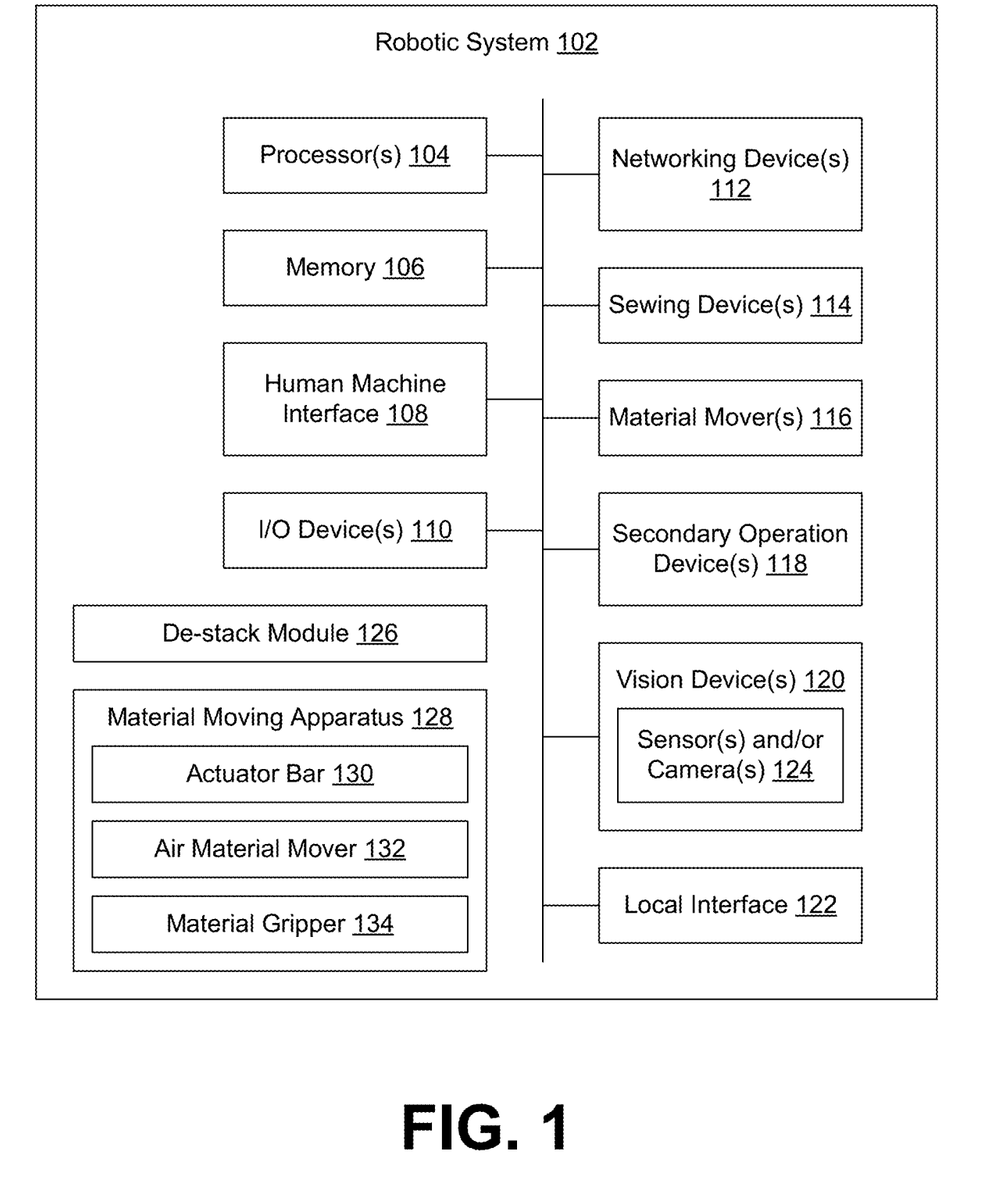
FIG. 1 illustrates an example of a robotic system, according to various embodiments of the present disclosure.

Referring to FIG. 1, shown is an example of a system that can be used for material manipulation and sewing. As illustrated in the example of FIG. 1, the system can comprise a robotic system 102, which can include a processor 104, memory 106, an interface such as, e.g., a human machine interface (HMI) 108, I/O device(s) 110, networking device(s) 112, a sewing device 114, material mover(s) 116, secondary operation device(s) 118, vision device(s) 120, and a local interface 122. The vision device(s) 120 can comprise a sensor and/or camera 124 such as, e.g., an RGB camera, an RGB-D camera, a near infrared (NIR) camera, stereoscopic camera, photometric stereo camera (single camera with multiple illumination options), time of flight camera, IP camera, light-field camera, monorail camera, multiplane camera, rapatronic camera, still camera, thermal imaging camera, acoustic camera, rangefinder camera, etc. The robotic system 102 can also include a de-stacker module 126, which can be executed to implement manipulation of stacked materials, and a material moving apparatus 128, which can comprise an actuator bar 130, an air material mover 132 and/or a material gripper 134.

The robotic system 102 can grip a piece of product material and move it to a work area through the de-stacker module 126. The air material mover 132 can separate an uppermost (or top) layer of stacked material for gripping and transport to the work area. The material gripper 134 can secure the material during transport and release it at the desired location in the work area for further processing. If additional material is desired, the de-stacker module 126 can repeat the process to obtain the next piece of material from the stack, by the robotic system 102.

The processor 104 can be configured to decode and execute any instructions received from one or more other electronic devices or servers. The processor can include one or more general-purpose processors (e.g., INTEL® or Advanced Micro Devices® (AMD) microprocessors) and/or one or more special purpose processors (e.g., digital signal processors or Xilinx® System on Chip (SOC) field programmable gate array (FPGA) processor). The processor 104 may be configured to execute one or more computer-readable program instructions, such as program instructions to carry out any of the functions described in this description.

The Memory 106 can include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions. The Memory 106 can comprise one or more modules that can be implemented as a program executable by processor(s) 104.

The interface(s) or HMI 108 can either accept inputs from users or provide outputs to the users or may perform both the actions. In one case, a user can interact with the interface(s) using one or more user-interactive objects and devices. The user-interactive objects and devices may comprise user input buttons, switches, knobs, levers, keys, trackballs, touchpads, cameras, microphones, motion sensors, heat sensors, inertial sensors, touch sensors, or a combination of the above. Further, the interface(s) can either be implemented as a command line interface (CLI), a graphical user interface (GUI), a voice interface, or a web-based user-interface, at element 108.

The input/output devices or I/O devices 110 of the robotic system 102 can comprise components used to facilitate connections of the processor 104 to other devices such as, e.g., sewing device 114, material mover(s) 116, secondary operation device(s) 118 and/or vision device(s) 120 and for instance, can comprise one or more serial, parallel, small system interface (SCSI), universal serial bus (USB), IEEE 1394 (i.e. Firewire™) connection elements, or other appropriate connection elements.

The networking device(s) 112 of the robotic system 102 can comprise the various components used to transmit and/or receive data over a network. The networking device(s) 112 can include a device that can communicate both inputs and outputs, for instance, a modulator/demodulator (i.e. modem), a radio frequency (RF) or infrared (IR) transceiver, a telephonic interface, a bridge, a router, as well as a network card, etc.

The sewing device 114 of the robotic system 102 facilitates sewing the product materials together and can be configured to sew a perimeter, along markings on the product material, or other paths based on tracking a generated pattern. In additional embodiments, the sewing device 114 can include a knife device in order to cut threads, stitches, materials from the workpiece etc. The material mover(s) 116, of the robotic system 102 can facilitate moving the product material(s) during the cutting and sewing operations, at element 116. The secondary operation device(s) 118 can include stacking device(s), folding device(s), label manipulation device(s), and/or other device(s) that assist with the preparation, making and/or finishing of the sewn product.

The vision device(s) 120 of the robotic system 102 can facilitate detecting the movement of the product material(s) and inspecting the product material(s) for defects and/or discrepancies during a sewing and cutting operation. Further, the vision device(s) 120 can facilitate detecting markings on the product before cutting or sewing the material. A vision device 120 can comprise, but is not limited to, an RGB-D camera, near IR camera, time of flight camera, Internet protocol (IP) camera, light-field camera, monorail camera, multiplane camera, rapatronic camera, stereo camera, still camera, thermal imaging camera, acoustic camera, rangefinder camera, etc., at element 120. The RGB-D camera is a digital camera that can provide color (RGB) and depth information for pixels in an image.

The local interface 122 of the robotic system 102 can be, for example, but not limited to, one or more buses or other wired or wireless connections, as is known in the art. The local interface 122 can have additional elements, which are omitted for simplicity, such as controllers, buffers (caches), drivers, repeaters, and receivers, to enable communications. Further, the local interface 122 can include address, control, and/or data connections to enable appropriate communications among the components, at element 122.

As shown in FIG. 1, the robotic system 102 includes a de-stack module 126 which can control the material moving apparatus 128, as will be discussed. The de-stack module 126 is a process that can be executed in order to move an uppermost layer of a stack of material to a work area or space using the material moving apparatus 128. An actuator bar 130 can be used for moving a piece of material from a stack of product materials to the work area. A material gripper 134 attached to the actuator bar 130 can secure the piece of material and move it onto a workspace. Examples of the material gripper 134 include, e.g., a pinching style gripper, electro-adhesive gripper, or needle gripper, among others. An air material mover 132 can also be attached to the actuator bar 122. The air material mover 132 can be formed with orifices that exit the surface at a low angle, for example, in a range from 0 degrees to about 30 degrees. Air provided to the air material mover 132 blows through the formed orifices where, upon exiting, it creates a localized vacuum (e.g. an area of lower than ambient pressure) that lifts the product material toward the air material mover 132 allowing an uppermost piece of the material to be captured by the material gripper 134. A combination of multiple orifices that provide air jets at varying heights and pressures can tailor the desired material behavior to further assist in layer separation.

Functioning of the de-stack module 126 of the robotic system 102 will now be explained with reference to FIG. 2. One skilled in the art will appreciate that, for this and other processes and methods disclosed herein, the functions performed in the processes and methods may be implemented in differing order. Furthermore, the outlined steps and operations are only provided as examples, and some of the steps and operations may be rearranged, optional, combined into fewer steps and operations, or expanded into additional steps and operations without detracting from the essence of the disclosed embodiments.

Figure 2:
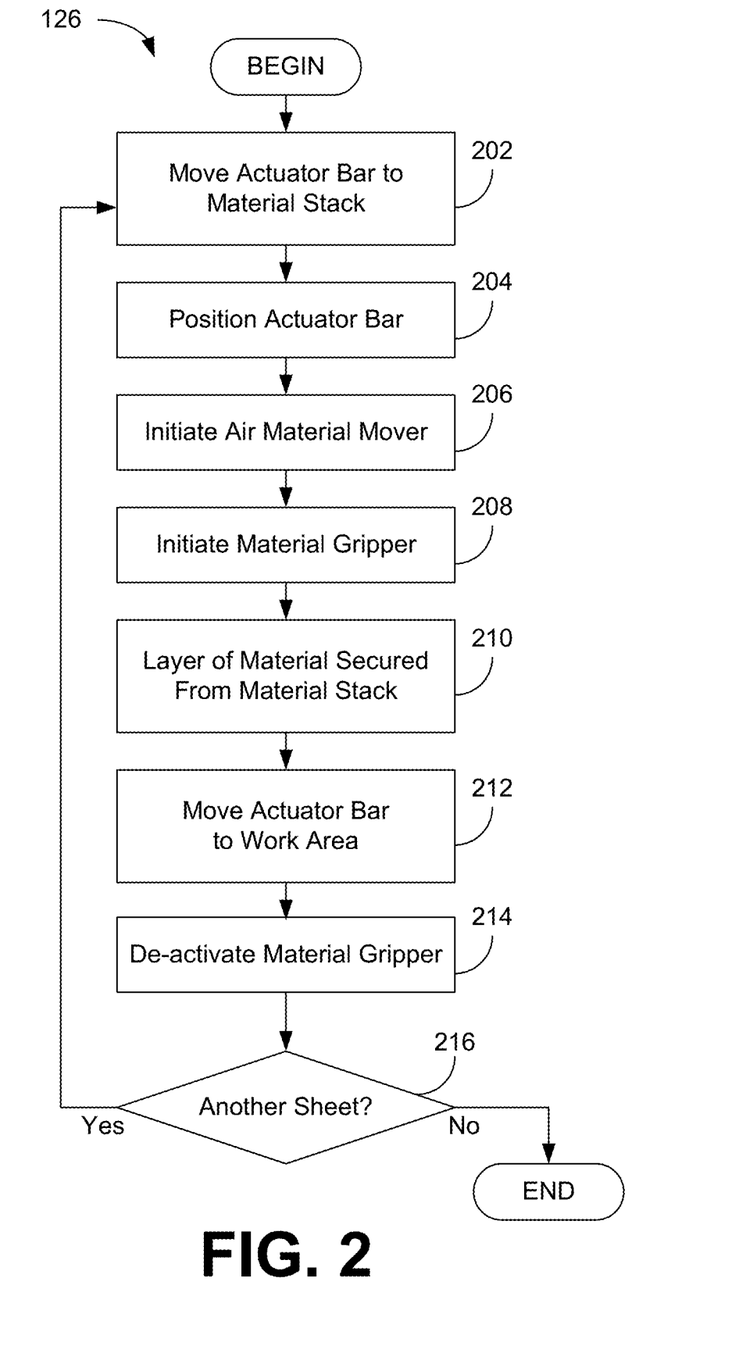
FIG. 2 illustrates an example of a de-stack module, according to various embodiments of the present disclosure.

The flow chart of FIG. 2 shows the architecture, functionality, and operation of a possible implementation of the de-stack module 126. The process begins at 202 with the controller positioning the actuator bar 130 being moved to the stack of product material, e.g., by a controller of the material moving apparatus 128 or actuator bar 130. For example, the actuator bar 130 can be positioned over the stack of the materials at 202 using an industrial robot, a robotic arm, linear actuator, or other controlled mechanical linkages and/or actuators. Industrial robots include, e.g., articulated robots, selective compliance assembly robots (SCARA), delta robots, and cartesian coordinate robots (e.g., gantry robots or x-y-z robots). Industrial robots can be programmed to carry out repetitive actions with a high degree of accuracy or can exhibit more flexibility by utilizing, e.g., machine vision and machine learning. Then at 204, the actuator bar 130 is positioned towards the material stack. The controller can lower the actuator bar 130 down towards the stack of materials at 204. In another embodiment, the material stack may be actuated upwards towards the actuator bar 130.

Next, at 206 the de-stack module 126 can activate the air material mover 132, which provides airflow across the uppermost layer of the stack of materials. The airflow causes separation between the uppermost layer and the rest of the stack of materials and may also cause flutter in the uppermost layer. The fluttering (or other motion along the edge of the material) can assist in separating the lower ply(s) from the uppermost layer for gripping, and is caused in large part by turbulent flow along the boundaries of the airstream In some embodiments, the air material mover 132 may be activated prior to the process. In some embodiments, the air material mover 132 may be continuously activated so that there is always airflow provided through the air material mover 132, at 206.

At 208, the de-stack module 126 can initiate (or activate) operation of the material gripper 134. In some embodiments, the material gripper 134 can be a clamp, pinching gripper, electro-adhesive gripper, or needle gripper or other appropriates gripping mechanism. In other embodiments, a plurality of the same or different gripping mechanisms may be used. The material gripper 134 can be connected to the actuator bar 130 or can be connected to a separate actuator bar or end effector. For example, the uppermost layer of the material stack can be secured by the material gripper 134 attached to the actuator bar 130. The air material mover 132 can separate the uppermost layer to allow the material gripper 134 to secure the material at 210 for transport. Then the de-stack module 126 can deactivate the air material mover 132. In some embodiments, the air material mover 132 may not be de-activated and may be activated continuously during the de-stacking process, e.g., from 208-214.

The actuator bar 130 can be moved to the work area or space to transport the gripped piece of material at 212. The actuator bar 130 moves to the work area with the uppermost layer of the stack of materials secured by material gripper 134. Once the actuator bar 130 is over a predetermined location on the work area, the material gripper 134 can be deactivated, releasing the piece of material on the work area at 214. It another piece of material is desired at 216, the process returns to 202 where the next piece of product material can be gripped and moved to the work area. If another piece is not needed, then the process ends.

Functioning of an example of material mover apparatus will now be explained with reference to FIGS. 3-5. One skilled in the art can appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 3:
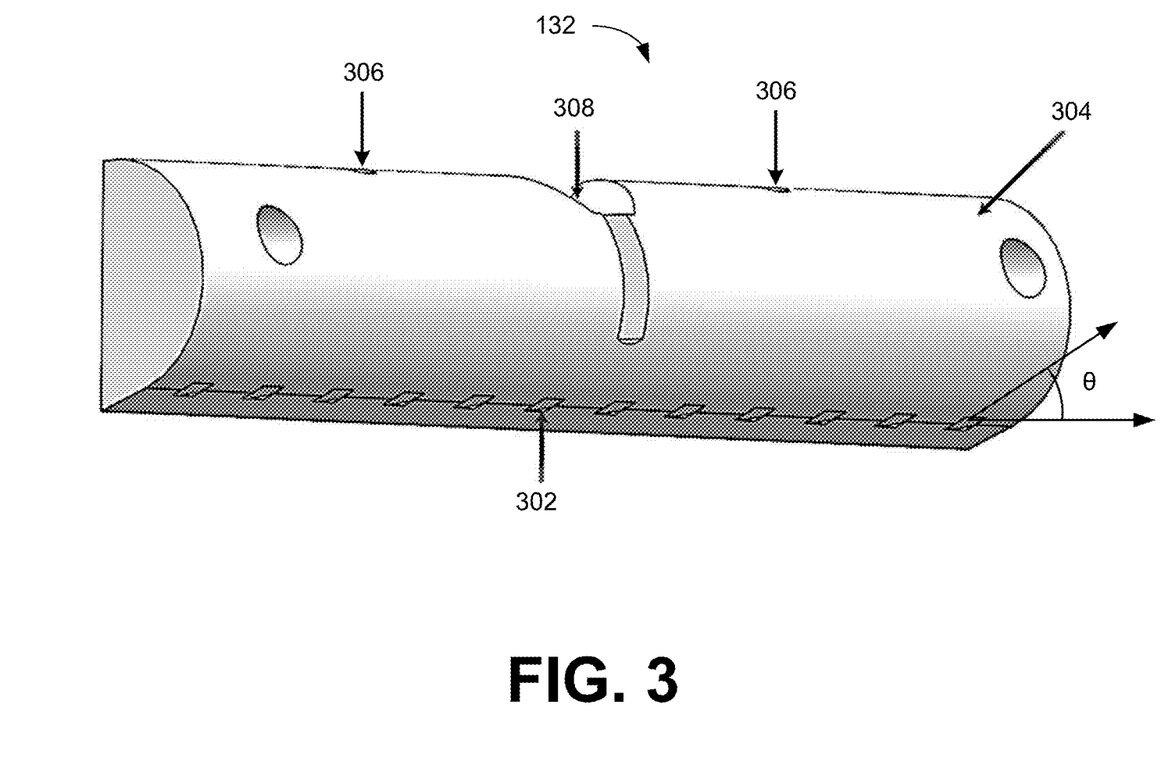
FIGS. 3-5 illustrate an example of a material moving apparatus, according to various embodiments of the present disclosure.
Figure 4:
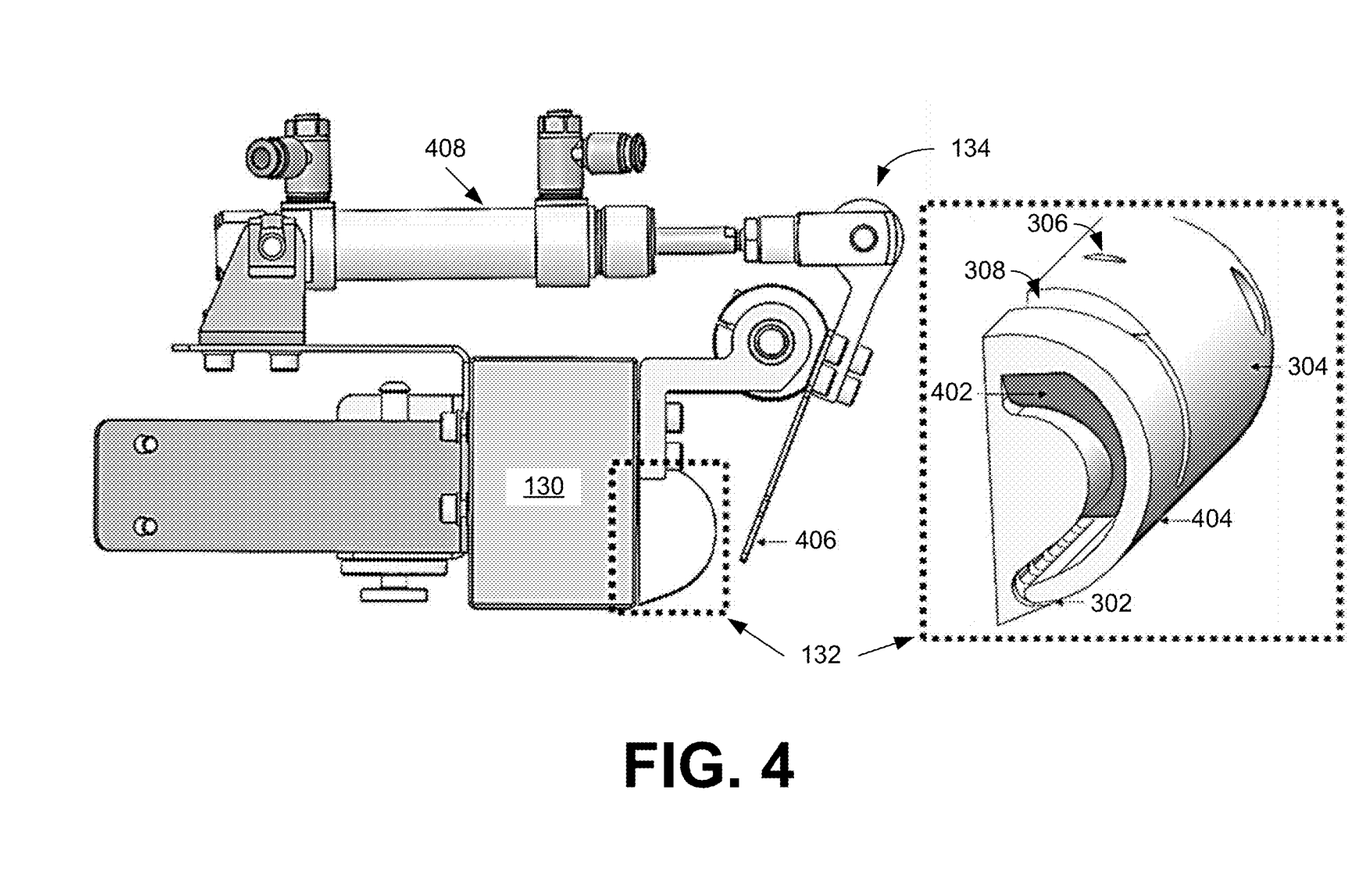

FIG. 3 illustrates an example of an air material mover 132 of the robotic system 102 which can be attached to the actuator bar 130 as shown in FIG. 4. The air material mover comprises one or more air chambers with one or more formed orifices 302 that exit an outer surface 304 of the air material mover 132 at a low angle θ, for example, in a range from 0 degrees to about 30 degrees. Compressed air (or other gas) can be provided to the one or more air chambers, which channels the compressed air to the outlets 302 where the air is expelled parallel to (or at a low angle to) a surface of, e.g., the material. The curved shape of the air material mover 132 allows the ejected air to travel at least partially along the curvature of the outer surface 304 which creates a localized vacuum that lifts the uppermost (or top) piece of the material stack allowing the material to be captured by the material gripper 134.

The compressed air (or other gas) can be inputted into the air material mover 132 through, e.g., the top of the device at one or more air input(s) 306 as depicted in FIG. 3, or at another appropriate location on the air material mover 132. The air input(s) 306 can include a channel or channels to the air chamber(s) located within the air material mover 132. In some embodiments, the compressed air maybe standard compressed air. In other embodiments, the compressed air can be deionized compressed air. In various embodiments, the compressed air can be static free compressed air and or dehumidified compressed air. In one or more embodiments, the compressed air can be a combination of compressed airs such as, e.g., a mixture of standard compressed air and deionized compressed air or other combination that can provide a desired result. The compressed air can be pre-mixed, mixed prior to entering the air chamber or mixed within the air inlet(s) 306 or the air chamber(s) of the air material mover 132.

The front of the air material mover 132 can be shaped as a curve in order to cause the air ejected from the outlets or orifices 302 to travel upwards on the air material mover 132. In other embodiments, the front of the air mover may be shaped as a flat, sloped face. In yet other embodiments, the front of the air mover may be shaped as a combination of curves and/or flat, sloped faces. This airflow can manipulate the piece of material in the stack to lift, flutter, or move in a manner that assists in separating the layers and makes it capturable by the material gripper 134 as will be discussed. The air material mover 132 can be positioned, e.g., by the actuator bar 130 on top of (or over) the stack materials near an edge of the stack of product materials. This can allow for manipulation of the edge of the materials while restraining a portion of the top layer of the material.

The air orifices 302 of the air material mover 132 are positioned along a length of the device in an array to provide manipulation of the entire edge of the top layered material. The air orifices 302 exit the device surface at a low angle θ, for example, in a range from 0 degrees to about 30 degrees. The compressed air upon exiting the orifices 302 creates a localized vacuum that lifts the material in the stack. In some embodiments, the air input(s) 306 can be activated or deactivated to control which portions of the material are manipulated. In some embodiments, the air orifices may be activated in groups or independently to achieve the desired material manipulation. In some embodiments, the air orifices may be arranged in 2 or more rows to achieve the desired material manipulation. In some embodiments, the air orifices may be arranged in a non-grid pattern to achieve the desired material manipulation.

The air material mover 132 can also include one or more sensor(s) configured to detect when the piece of material is drawn against (or adjacent to) the outer surface 304. Sensors can include, but are not limited to, optical or electrical proximity sensors which can be incorporated into the air material mover 132. For example, the air material mover 132 can include one or more recess or channel configured to retain a sensor without restricting operation of the air material mover 132. In the example of FIG. 3, the air material mover 132 includes a channel 308 that can contain a sensor such as, e.g., a fiber wire. The sensor can detect the piece of material as it moves toward or over the outer surface 304 of the air material mover 132. Other types or combinations of sensors can also be incorporated into the air material mover 132.

Referring next to FIG. 4, shown is an example of the material moving apparatus 400 including air material mover 132 of FIG. 3. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

FIG. 4 shows a cross-sectional view of the air material mover 132 which can be attached to an actuator bar 130. The air material mover 132 can comprise one or more air chamber(s) 402 with formed orifices 302 that exit the outer surface 304 at a low angle θ, for example, in a range from 0 degrees to about 30 degrees. Compressed air provided to the one or more air chamber(s) 402 via the air inlet(s) 306 can be channeled to the outlets 302 which direct the air parallel to (or substantially parallel to) a surface of, e.g., the stack of material. The air chamber(s) 402 can direct the compressed air to provide a substantially even distribution of airflow from the orifices 302. The curved shape of the air material mover 132 allows the ejected air to travel along the curvature 404 of the outer surface 304 which creates a localized vacuum that lifts the uppermost piece of the stack of product material, drawing it towards the air material mover 132. The resulting effect allows the piece of material to be captured by the material gripper 134.

The compressed air can be provided through the top of the air material mover 132. For example, the compressed air can flow through the air input(s) 306, which can provide a channel to the air chamber 402 located within the air material mover 132. In various embodiments, the compressed air can be standard compressed air. In some embodiments, the compressed air can be deionized compressed air. In other embodiments, the compressed air can be static free compressed air. In some embodiments, the compressed air may be a combination of compressed air, for example a mixture of standard compressed air and deionized compressed, that can be pre-mixed, mixed prior to entering the air chamber 402 or mixed within the air chamber 402 of the air material mover 132.

The front of the air material mover 132 can be shaped as a curve allowing the discharged air to travel upwards along the outer surface 304 of the air material mover 132 thus manipulating the stacked material to lift, flutter, or move in a manner that makes the uppermost (or top) piece of material capturable by, e.g., gripping or clamping elements 406 of the material gripper 134. The air material mover 132 can be positioned on top of the stack of product materials near an edge of the material pieces. This allows the edge of product materials to be manipulated while restraining a portion of the top layer of the material.

An air chamber 402 which is located within the air material mover 132, receives the compressed air via the air input(s) 306 and channels it to the air orifices 302. The air chamber 402 can extend along the internal length of the air material mover 132 and can include baffles to assist in evenly distributing the compressed air across the orifices 302. In some embodiments a plurality of air chambers may exist within the air material mover, connecting different sets of air orifices. The curvature 404 of the air material mover 132 can be shaped to allow the air expelled through the openings 302 to flow at a low angle to the surface upon exiting the air material mover 132 and follow the curvature of the outer surface 304. The directed airflow allows the top (or uppermost) layer of the stack of materials to flutter, lift, or move in a manner, separating the top layer from the lower layers and making it accessible to be secured by the material gripper 134.

The air orifices 302 of the air material mover 132 are positioned along its length in an array (e.g., one or more rows of one or more air orifices that can be distributed uniformly or non-uniformly across the length of the air material mover 132) to provide manipulation of the edge of the top layer of stacked material. In some embodiments, a single air orifice may be used. In other embodiments, air orifices may vary is shape, size and/or spacing. In some embodiment, air material movers 132 may be positioned along more than one edge of the top layer of stacked material. The orifices can be curved to redirect the compressed air in the desired direction. For example, the air orifices 302 can exit along the bottom surface of the air material mover 132 at a low angle, for example, in a range from 0 degrees to about 30 degrees. Upon exiting the orifices 302, the airflow creates a localized vacuum that can lift the edge of the material piece for gripping by the material gripper 134. In some embodiments, the air input(s) 306 be activated or deactivated to control which portions of the material are manipulated.

The material gripper 134 can secure a piece of stacked material in order to move the piece of material into a workspace. In the example of FIG. 4, the material gripper 134 is attached to the actuator bar 130. The material gripper 134 includes gripping or clamping elements 406 that can secure a section of a piece of material. The gripping elements 406 can be pivotally mounted to the actuator bar 130 and operated by a linear or rotary actuator 408 coupled opposite the gripping or clamping elements 406. Activation of the air material mover 132 causes the gripping elements 406 to pivot towards the outer surface 304 of the air material mover 132 until the distal ends clamp the top layer of the stacked material between the air material mover 132 and the material gripper 134. In some embodiments, the material gripper 134 may be a pinching gripper, electro-adhesive gripper, or needle gripper, or other appropriate gripping device, with mounting and actuation appropriate to that device.

The actuator bar 130 can be repositioned to transport the piece of gripped material from the stack of product material to the work area for further processing by the robotic system 102. Actuator bar 130 may have one or more air material mover(s) 132 and/or material grippers 134 attached to it in order to secure the piece of material. The actuator bar 130 can be positioned over the stack of material and lowered down to allow the air material mover 132 to contact the stack of materials. In some embodiments, the stack can be lifted (or raised) towards the air material mover 132. Once the top layer (or ply) of the stacked material is secured between the material gripper 134 and the air material mover 132, the actuator bar 130 can be lifted and positioned over a work area where the piece of material is placed by releasing the material gripper 134.

Functioning of the material moving apparatus will now be further explained with reference to FIG. 5. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
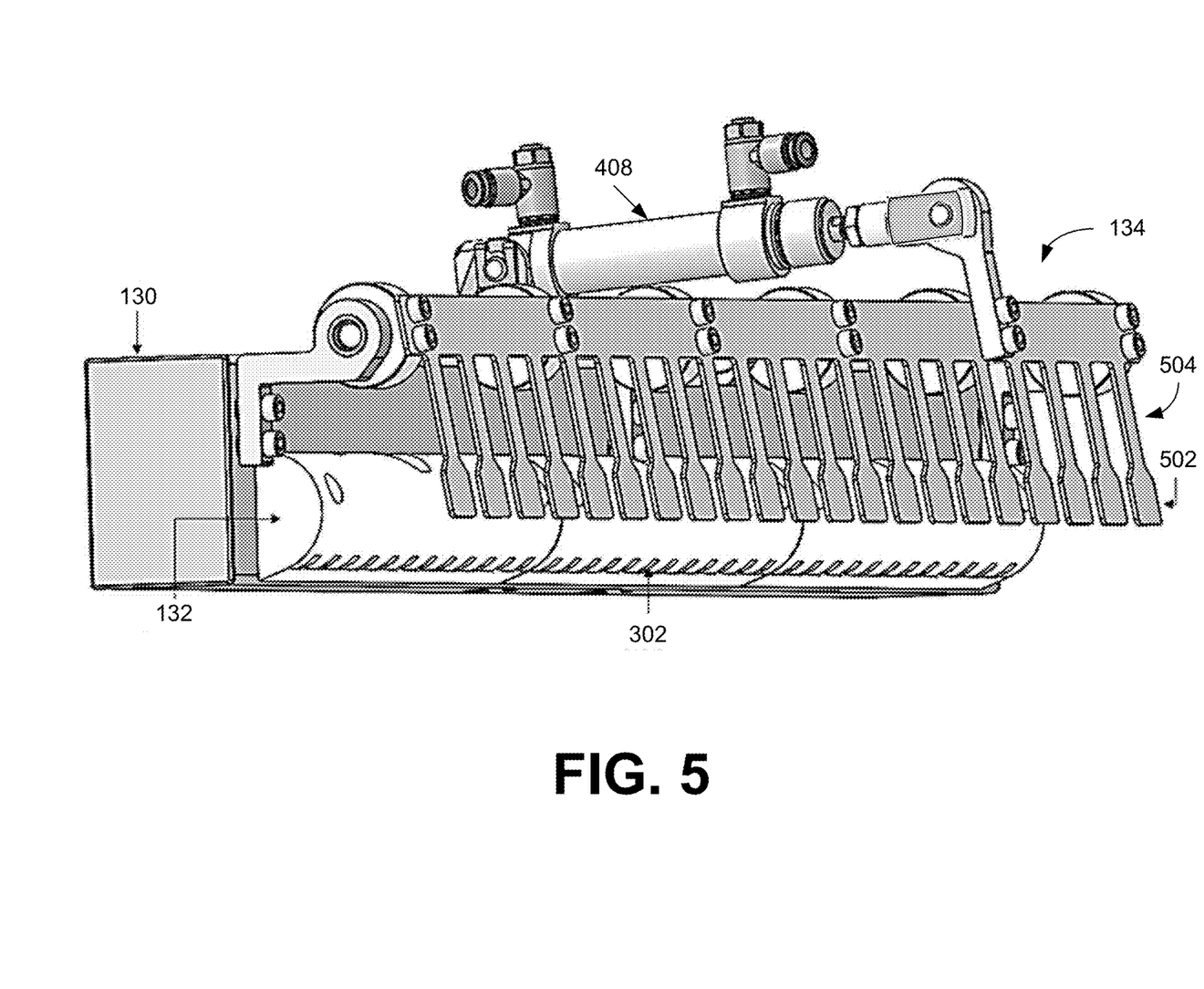

FIG. 5 illustrates an example of the material moving apparatus comprising an actuator bar 130, air material movers 132 and a material gripper 134. The air material movers 132 are attached to the actuator bar 130 and contain one or more air chambers with orifices 302 that exit the outer surface 304 at a low angle, for example, in a range from 0 degrees to about 30 degrees. When the air material mover 132 contacts the top layer of the material stack, the air supply can be activated through the de-stack module 126 (FIG. 2) which initiates the airflow to travel to the air input(s) 306 (FIG. 3) and through the air chamber 402 (FIG. 4) to the surface orifices 302.

The air from the orifices 302 allow the top layer of the stacked material to be manipulated in a manner that results in the material fluttering or moving in a manner that facilitates gripping by the material gripper 134. The air supply may be compressed air provided to the one or more air chambers 402, where the compressed air can be channeled to outlets 302 which direct the air parallel to (or substantially parallel to) a surface. The curved shape of the air material mover 132 allows for the discharged air to travel along the curvature 404 (FIG. 4) of the air material mover 132 which creates a localized vacuum that lifts the uppermost piece of material toward the outer surface 304 of the air material mover 132, allowing the material to be captured by the material gripper 134.

In the example of FIG. 5, the air supply is transported to the air inputs(s) 306 of the air material mover 132 using tubes with the source of the air supply located elsewhere. In some embodiments, the source of the air supply may be attached to the actuator bar 130 using compressed air canister(s) or other appropriate storage container(s).

The material gripper 134 can secure a piece of material (e.g., against the outer surface of the air material mover 132) in order to move the piece of material into a workspace. The material gripper 134 can comprise a clamping mechanism that is attached to the actuator bar 130. For example, the clamping mechanism can include gripping or clamping elements 406 (FIG. 4) having clamping pads 502 at the end of fingers 504 (e.g. structural members) that extend from a mounting bar pivotally mounted to the actuator bar 103.

An activation device such as, e.g., a piston 408 (or other linear or rotary actuator) can be activated to extend a piston rod coupled to the clamping mechanism through mechanical linkage, causing the clamping pads 502 to pivot towards the air material mover 132 to grip a piece of product material after the air material mover 132 is activated. Once activated, the clamp moves towards the outer surface of the air material mover(a) 132 until it clamps the top layer of the stack materials between the air material movers 132 and the clamping pads 502 of the material gripper 134. In some embodiments, the material gripper 134 may be a pinching gripper, electro-adhesive gripper, or needle gripper, or other appropriate gripping or clamping device.

Once gripped, the actuator bar 130 can be repositioned to transport the piece of material from the stack of materials to the work area. The actuator bar 130 may have one or more material grippers 134 attached to it in order to secure the piece of material for transport. The actuator bar 130 can be positioned over the stack of materials and, e.g., lowered down to allow the air material mover 132 to contact the top of the stack of materials, and the air supply initiated to separate an edge of the uppermost (or top) layer of material from the stack and draw it towards the air material mover 132. Once the top layer of the material is secured between the material gripper 134 and the air material mover 132, the actuator bar 130 can be lifted and moved or repositioned over a work area where the piece of material is released.

The air orifices 302 of the air material mover 132 can be positioned along the lower surface of the air material mover 132 in an array to provide manipulation of the entire edge of the top layer of stacked material. The air orifices 302 can exit the surface at a low angle, for example, in a range from 0 degrees to about 30 degrees or in a range from 0 degrees to about 20 degrees. When the compressed air provided to the air material mover 132 exits through the orifices 302, the airflow creates a localized vacuum that lifts the material for gripping by the material gripper 134. In some embodiments, the air input may be activated or deactivated to control which portions of the material edge are manipulated.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. A material moving apparatus, comprising:
an air material mover comprising:
an array of orifices extending across the air material mover, the array of orifices configured to direct a flow of gas along an outer surface of the air material mover;
at least one chamber configured to distribute the gas to the array of orifices, wherein the at least one chamber comprises baffles that assist in even distribution of the gas across the array of orifices; and
a material gripper comprising at least one clamping element configured to clamp material attracted by the flow of gas against the outer surface of the air material mover.

2. The material moving apparatus of claim 1, wherein the outer surface of the air material mover is curved.

3. The material moving apparatus of claim 2, wherein a localized vacuum is formed by the flow of gas through the array of orifices traveling along the curvature of the outer surface.

4. The material moving apparatus of claim 3, wherein the material is attracted towards the outer surface by the localized vacuum when the air material mover is positioned with the array of orifices adjacent to an edge of the material.

5. The material moving apparatus of claim 2, wherein the at least one clamping element clamps the material adjacent to an apex of the curved outer surface.

6. The material moving apparatus of claim 1, wherein the gas is provided to the at least one chamber via at least one inlet.

7. The material moving apparatus of claim 6, wherein the gas is compressed air.

8. The material moving apparatus of claim 1, wherein the air material mover comprises a plurality of chambers that distribute the gas to the array of orifices.

9. The material moving apparatus of claim 1, wherein individual orifices of the array of orifices comprise curved channels extending from the at least one chamber to the outer surface.

10. The material moving apparatus of claim 1, wherein the array of orifices is non-uniformly distributed across the air material mover.

11. The material moving apparatus of claim 1, comprising a plurality of air material movers distributed across the material moving apparatus.

12. The material moving apparatus of claim 11, wherein the material gripper comprises a plurality of clamping elements.

13. A material moving apparatus, comprising:
an air material mover comprising an array of orifices extending across the air material mover, the array of orifices configured to direct a flow of gas along an outer surface of the air material mover; and
a material gripper comprising at least one clamping element configured to clamp material attracted by the flow of gas against the outer surface of the air material mover, wherein the at least one clamping element extends from a mounting bar pivotally mounted to an actuator bar coupled to the air material mover and the material gripper comprises an actuation device coupled to the mounting bar, the actuation device configured to rotate the at least one clamping element toward the outer surface of the air material mover.

14. The material moving apparatus of claim 13, wherein the air material mover comprises at least one chamber configured to distribute the gas to the array of orifices.

15. The material moving apparatus of claim 13, wherein the at least one clamping element comprises fingers extending from the mounting bar to clamping pads.

16. The material moving apparatus of claim 13, wherein the actuation device is pneumatically actuated.

17. The material moving apparatus of claim 13, wherein the air material mover and the material gripper are coupled to the actuator bar.

18. A material moving apparatus, comprising:
an air material mover comprising an array of orifices extending across the air material mover, the array of orifices configured to direct a flow of gas along an outer surface of the air material mover; and
a material gripper comprising at least one clamping element configured to clamp material attracted by the flow of gas against the outer surface of the air material mover, wherein the air material mover and the material gripper are coupled to an actuator bar and movement of the actuator bar is provided through an industrial robot configured for positioning the air material mover adjacent to an edge of the material.

19. The material moving apparatus of claim 18, wherein the at least one clamping element extends from a mounting bar pivotally mounted to the actuator bar coupled to the air material mover.

20. The material moving apparatus of claim 18, wherein the air material mover comprises at least one chamber configured to distribute the gas to the array of orifices.

* * * * *